United States Patent [19]

Rogers, Jr.

[11] 4,065,155
[45] Dec. 27, 1977

[54] BELT RETRACTOR WITH WINDING PREVENTION MECHANISM

[75] Inventor: Lloyd W. Rogers, Jr., Utica, Mich.

[73] Assignee: General Motors Corporation, Detroit, Mich.

[21] Appl. No.: 750,692

[22] Filed: Dec. 15, 1976

[51] Int. Cl.² .............................................. B60R 21/10
[52] U.S. Cl. .................................. 280/744; 242/107.7
[58] Field of Search ..................... 280/744; 242/107.7, 242/107.4 R, 107.4 A

[56] References Cited

U.S. PATENT DOCUMENTS

| 3,834,646 | 9/1974 | Heath | 242/107.7 |
| 3,869,098 | 3/1975 | Sprecher | 242/107.4 A |
| 4,002,311 | 1/1977 | Fisher et al. | 280/744 |
| 4,023,746 | 5/1977 | Magyar | 242/107.7 |

*Primary Examiner*—Robert R. Song
*Attorney, Agent, or Firm*—Charles E. Leahy

[57] ABSTRACT

A seat belt retractor has a reel for winding and unwinding a restraint belt and a winding spring urging winding rotation of the reel to tension the belt about the body of a seat occupant. A pawl is pivotally mounted for engagement with a ratchet wheel carried by the reel to prevent belt winding rotation and thereby relieve the tension on the belt. A spring acts on the pawl to normally urge the pawl toward engagement with the ratchet reel and goes overcenter upon predetermined movement of the pawl away from engagement with the ratchet wheel so that the spring holds the pawl in a disabled position. A control disc is connected to the reel by a friction clutch for rotation therewith and has a cam surface for controlling movement of the pawl into and out of engagement with the ratchet wheel and further cam surfaces for operating the pawl to and from the disabled position upon predetermined sequence of rotation of the control disc.

4 Claims, 10 Drawing Figures

BELT RETRACTOR WITH WINDING PREVENTION MECHANISM

The invention relates generally to a belt retractor for a vehicle occupant restraint system and more particularly provides an improved winding prevention mechanism for holding the belt at a set length providing a slackened condition about the occupant.

Vehicle occupant restraint belt retractors have heretofore been provided with winding prevention mechanisms for selectively relieving the tension on the belt to enhance comfort of the restrained occupant. U.S. Pat. No. 3,869,098, issued Mar. 4, 1975 by Raymond G. Sprecher discloses a belt retractor having a winding prevention mechanism which is actuatable by the occupant without occupant effort independent of the normal effort expended in unwinding the belt from the reel. In Sprecher, a control disc and a blocking disc are frictionally clutched to the reel for rotation therewith and cooperate to control movement of a spring biased pawl between detenting and undetenting positions with respect to a ratchet wheel on the reel. The control disc controls movement of the spring biased pawl between the detenting position engaging the ratchet wheel to prevent reel rotation in the winding direction and an undetenting position disengaging the pawl from the ratchet wheel. The blocking disc is effective to capture and hold the pawl in undetenting position.

The present invention provides an improved and simplified winding prevention mechanism wherein the pawl is biased into engagement of the ratchet wheel by a spring which goes overcenter upon movement of the pawl away from engagement with the ratchet wheel so that the spring is effective to hold the pawl in a disabled position. A single disc is clutched for rotation with the reel and has a control surface configured to selectively move the pawl into and out of the detenting positions and further control movement of the pawl into and out of the disabled position.

A seat belt retractor according to the invention has a reel for winding and unwinding a belt and a winding spring urging winding rotation of the reel to tension a belt about the body of a seat occupant. A winding prevention pawl is pivotally mounted for engagement with a ratchet wheel carried by the reel to prevent belt winding rotation and thereby relieve the tension on the belt. A spring acts on the pawl normally urging the pawl toward engagement with the reaction reel. The spring goes overcenter upon predetermined movement of the pawl away from engagement with the ratchet wheel so that the spring holds the pawl in a disabled position. A control disc is connected to the reel for rotation therewith by a friction clutch and has a cam surface for controlling movement of the pawl into and out of engagement with the ratchet wheel and further cam surfaces for operating the pawl to and from the disabled position upon predetermined sequence of rotation of the control disc. A door operated plunger moves the pawl to the disabled position whenever the door is opened.

One object of the present invention is the provision of a seat belt retractor having a winding prevention pawl which is normally spring biased toward engagement with a ratchet wheel and wherein the bias spring goes overcenter to hold the pawl in a disabled condition.

Another object, feature and advantage of the invention is the provision of a single control disc frictionally connected by the reel for controlling movement of a spring biased winding prevention pawl between detenting and undetenting positions and controlling movement of the pawl to an overcenter disabled position.

These and other objects, features and advantages of the invention will become apparent upon consideration of the specification and the appended drawings in which.

Figure 1:
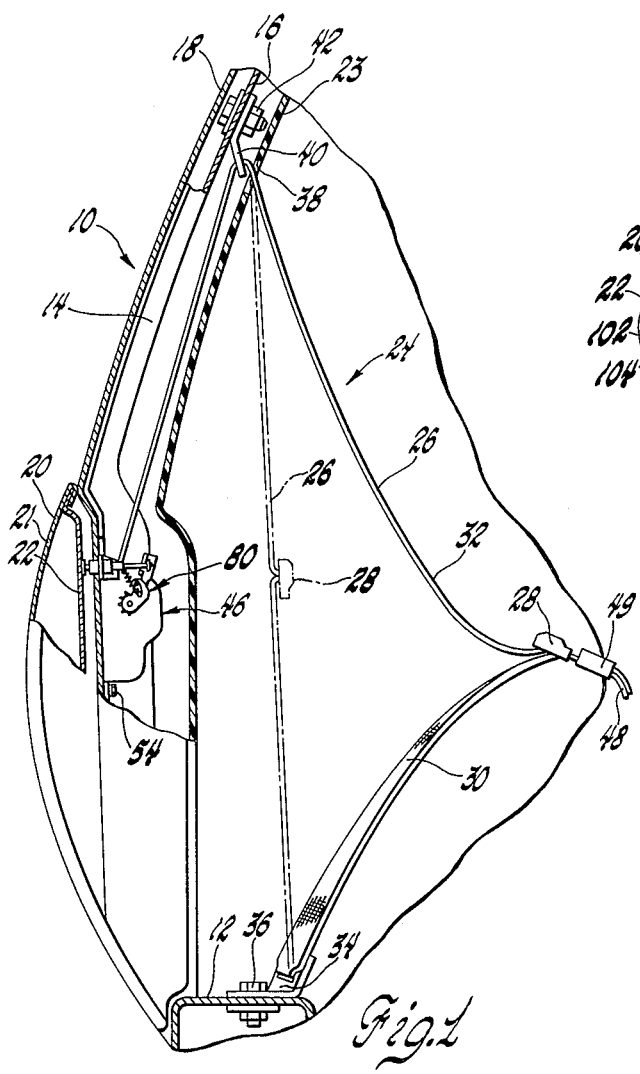
FIG. 1 is a sectional view of a vehicle body having a seat belt system employing a retractor according to the invention.

Referring to FIG. 1, a vehicle body is generally indicated by numeral 10 and includes a vehicle floor 12. A side pillar 14 of the vehicle body 10 extends vertically from the floor 12 to the vehicle roof, not shown, and includes an inner panel 16 and an outer panel 18 which are conventionally welded together. A trim panel 23 covers the pillar 14 and faces toward the passenger compartment of the vehicle body 10. A front door opening of the body is defined in part by the pillar 14 and partly by a forward pillar, not shown. A door 20 comprised of an outer panel 21 and an inner panel 22 is conventionally mounted on the front pillar of the vehicle body 10 for swinging movement between the closed position of FIG. 1 and an open position.

An occupant restraint belt system of the vehicle is generally indicated by numeral 24 and includes a belt 26 along which a D-ring assembly 28 is slidably disposed to define a lap belt portion 30 and a shoulder belt portion 32. The lower end of the lap belt portion 30 is suitably secured to an attachment plate 34 which is in turn secured to the floor 12 outboard of the vehicle seat by a nut and bolt assembly 36. The upper end of the belt 26 extends through an aperture 38 in the trim panel 23 and extends slidably through an apertured ring member 40 which is attached to the inner panel 16 of the pillar 14 by a bolt and nut assembly 42. The shoulder belt portion 32 of the belt 26 then extends downwardly from the ring member 40 to a belt retractor, indicated generally at 46, which is suitably mounted on the pillar 14 and hidden from view by the trim panel 23. Inboard of the vehicle seat, the belt system includes a belt portion 48 having its lower end, not shown, suitably attached to the vehicle floor 12. A buckle 49 on the end of the belt 48 is engageable with the D-ring assembly 28 to position the seat belt lap portion 30 and shoulder belt portion 32 in restraining position about the seated occupant. The D-ring assembly 28 is slidable along the belt 26 so that the relative lengths of the lap belt portion 30 and shoulder belt portion 32 may be adjusted to suit the particular occupant.

When the D-ring assembly 28 is disconnected from the buckle 49, the retractor 46 withdraws belt 26 through the ring member 40 thereby causing the lap belt portion 30 and shoulder belt portion 32 to assume the phantom line indicated position in FIG. 1 wherein the belt 26 is stored along the pillar 14 so as to facilitate ease of occupant ingress and egress.

Figure 2:
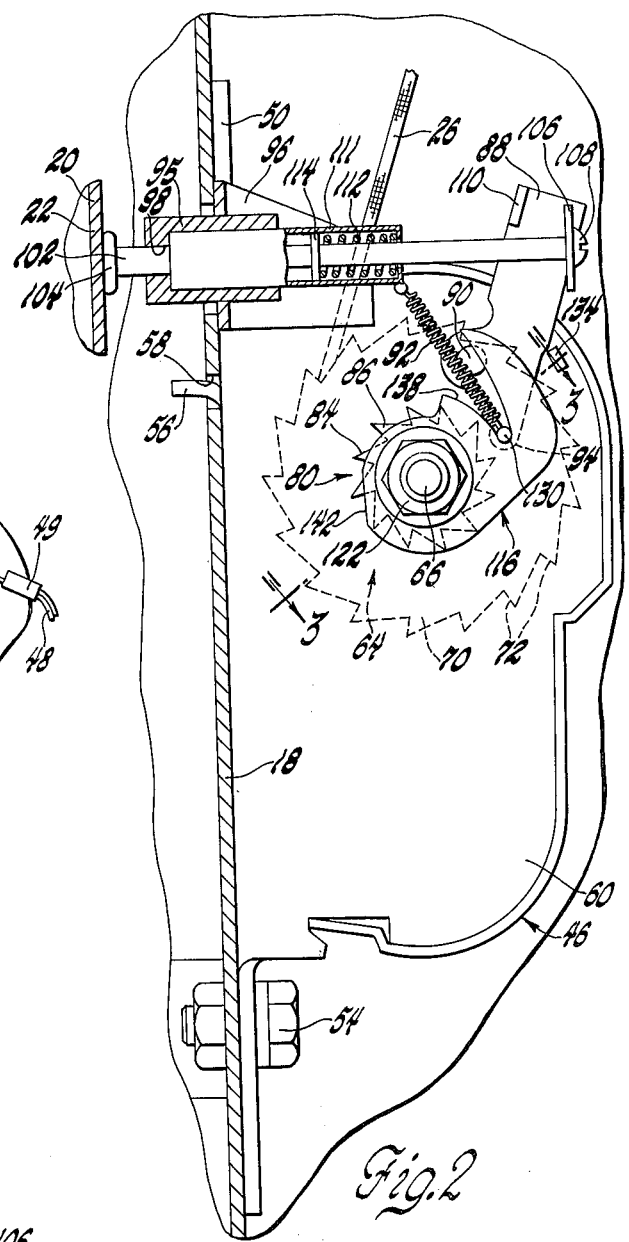
FIG. 2 is a sectional side elevation view of the belt retractor of FIG. 1 showing the vehicle door closed and the winding prevention mechanism in an undetenting position as when the seat belt is fully wound on the reel.

Referring to FIG. 2, the seat belt retractor 46 of this invention will be described. The retractor 46 includes a housing having a base wall 50 with a lower end secured to the pillar 14 by a nut and bolt assembly 54. The upper end of the base wall 50 has a tab 56 located in an aperture 58 of the pillar outer panel 18 to complete this securement and positioning of the retractor 46 on the pillar 14 of the vehicle body 10. The retractor housing also includes spaced parallel sidewalls 60 that are formed integral with the base wall 50.

A conventional belt reel, generally designated at 64, is rotatably mounted between the sidewalls 60 of the retractor housing and receives the end of belt 26. The conventional belt reel 64 includes an elongated drum on which the belt 26 is wound and which extends between ratchet plates 70 on the opposite sides of the belt. The ratchet plates 70 are suitably fixed to the opposite ends of the belt drum and have ratchet teeth 72 on the periphery thereof which face in the belt unwinding direction of reel rotation, this being the clockwise direction of rotation as viewed in FIG. 2. An elongated shaft 66 is received by the belt drum and suitably fixed to the ratchet plates 70 as by splining. The ends of the shaft 66 are rotatably supported on the housing sidewalls 60. The end of shaft 66, not shown in FIG. 2, extends outwardly through the adjacent housing sidewall 60, receives the inner end of a winding spring, the outer end of which is suitably fixed to the adjacent housing sidewall 60 so that the belt reel 64 is normally biased in the belt winding direction (counterclockwise in FIG. 2) to store the belt 26 on the belt reel 64. The end of the shaft 66, shown in FIG. 2, extends outwardly through the adjacent housing sidewall 60 and is received by a winding prevention mechanism, generally designated by 80 which will be described hereinafter.

A conventional inertia locking device is provided to lock the reel 64 against unwinding rotation whenever a predetermined inertia stimulus is encountered. The conventional inertia locking device includes a pawl which is pivotally mounted for selective engagement with the ratchet teeth 72 on the ratchet plates 70 of the reel 64. A pendulum is mounted for movement in response to a predetermined inertia stimulus and is adapted to move the pawl into locking engagement of the ratchet teeth of the reel in response to the predetermined inertia stimulus. In the absence on such an inertia stimulus, the occupant may freely unwind the belt to adjust his seating position and lean forwardly to reach the vehicle controls.

Reference may be had to U.S. Pat. No. 3,948,460 by Joseph D. Kondziola, issued Apr. 6, 1976, and assigned to the assignee of this invention for a complete description of a conventional inertia locking mechanism for a seat belt retractor.

Figure 3:
FIG. 3 is a sectional view taken in the direction of arrows 3—3 of FIG. 2.

Referring to FIGS. 2 and 3, a winding prevention mechanism generally indicated at 80 is provided to selectively prevent belt winding by the bias of the reel winding spring. The reel shaft 66 has a ratchet plate 84 attached thereto having a plurality of ratchet teeth 86 which face in the counterclockwise belt winding direction of reel rotation, oppositely of the direction of the ratchet teeth 72. A winding prevention pawl 88 is pivotally mounted on the housing sidewall 60 by a pivot shaft 90. The pawl 88 has a tooth 94 which is movable into a detenting position engaging one of the ratchet teeth 86 as shown in FIG. 4 to block belt winding rotation of the reel 64.

Figure 4:
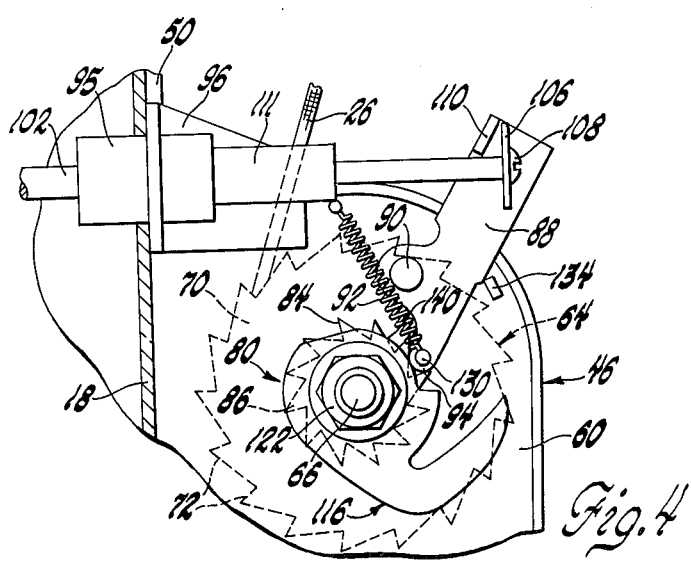
FIG. 4 is a view similar to FIG. 2 but showing the winding prevention mechanism in the detenting position in response to unwinding of the belt from the position of FIG. 2.

An interconnection is provided between the pawl 88 and the door 20 for moving the pawl out of the detenting position of FIG. 4 whenever the vehicle door 20 is moved to the open position. As best seen in FIG. 2, a mounting sleeve 95 is attached to the retractor 46 by a mounting bracket 96. The mounting sleeve has a bore 98 through which a plunger 102 is slidable. The plunger 102 has a knob 104 at its outer end which is engageable by the door 20. The inner end of the plunger 102 has a washer 106 attached thereto by a screw 108. The pawl 88 has a lateral leg 110 which is aligned for engagement by the washer 106. A spring housing 111 is attached to the mounting sleeve 95 and seats one end of a coil compression spring 112. The other end of the spring 112 is seated against a ring 114 which is carried by the plunger 102. The spring 112 urges the plunger 102 leftwardly of its position in FIG. 2 so that whenever the door 20 is moved from the closed position of FIG. 2 to an open position, the plunger 102 carries washer 106 into engagement of lateral leg 110 to move the pawl 88 out of the detenting position of FIG. 4.

As best seen in FIGS. 2 and 3, the winding prevention mechanism 80 includes a control disc 116 having a central aperture 118 which rotatably receives a reduced diameter end portion 120 of the reel shaft 66. Jam nuts 122 are threadedly engaged on the shaft end portion 120. A spring washer 126 acts between the ratchet plate 84 and control disc 116 urging the control disc into frictional engagement of the jam nuts 122 to provide a friction clutch between the reel shaft 66 and control disc 116. The outer peripheral surface 128 of the control disc 116 is configured to provide a series of control surfaces which are selectively engaged by an abutment pin 130 extending radially of the pawl 88 to control movement of the pawl 88.

A tension spring 92 has one end anchored on the spring housing 111 and its other end anchored on the abutment pin 130 of pawl 88. Ordinarily the spring 92 biases the pawl 88 in the direction toward engagement of its tooth 94 with the teeth 86 of the ratchet plate 84, as shown in FIGS. 2, 4, 5, 8 and 9. However, the relationship of the pawl pivot shaft 90 and the anchorages of the spring 92 is such that the spring 92 will go overcenter with respect to the pawl pivot shaft 90 to maintain the pawl 88 in a disabled condition engaging a stop 134 which extends laterally of the sidewall 60.

Figure 8:
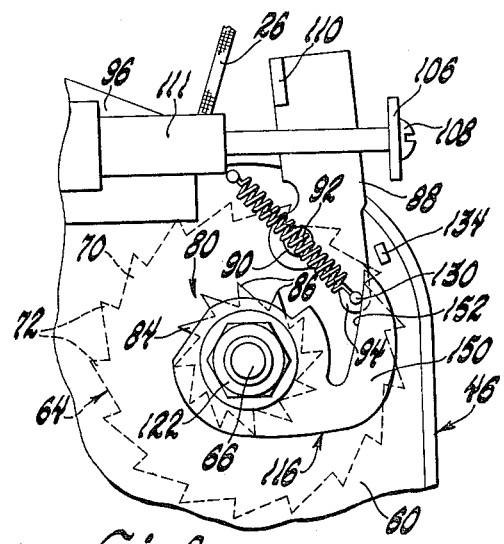
FIG. 8 is a view similar to FIG. 7 but showing the belt further rewound from the position of FIG. 7 and the pawl being moved from the disabled position to an undetenting position.
Figure 10:
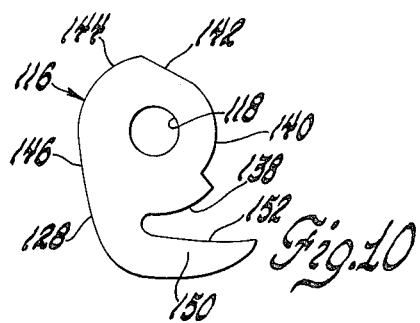
FIG. 10 shows the configuration of the control surface of the control disc of the invention.

Referring to FIG. 10, it is seen that the outer peripheral surface 128 of the control disc 116 includes a blocking surface 138 cooperating with abutment pin 130 and located at a radius sufficient to locate the pawl 88 to poise the pawl tooth 94 at a radial location above the ratchet teeth 86 of ratchet plate 84 as seen in FIG. 2. Adjacent the blocking surface 138 is a detenting control surface 140 having a radius less than that of blocking surface 138 and permitting the pawl tooth 94 to engage the ratchet teeth 86 as seen in FIG. 4. A cam surface 142 adjacent the detenting control surface 140 lifts or lowers the pawl tooth 94 from or to engagement with the ratchet teeth 84. A memory surface 144 adjacent the cam surface 142 has an elevation sufficient to maintain the pawl tooth 94 in an undetenting position of FIG. 5. A disabling cam surface 146 will move the pawl 88 radially outward to the overcenter position of FIG. 6. The control disc 116 also has a hook portion 150, the underside of which defines an enabling cam 152 which, as shown in FIG. 8, will return the pawl 88 from the overcenter disabled position of FIG. 6 to the undetenting position defined by engagement of pin 130 with the blocking surface 138.

OPERATION

Figure 5:
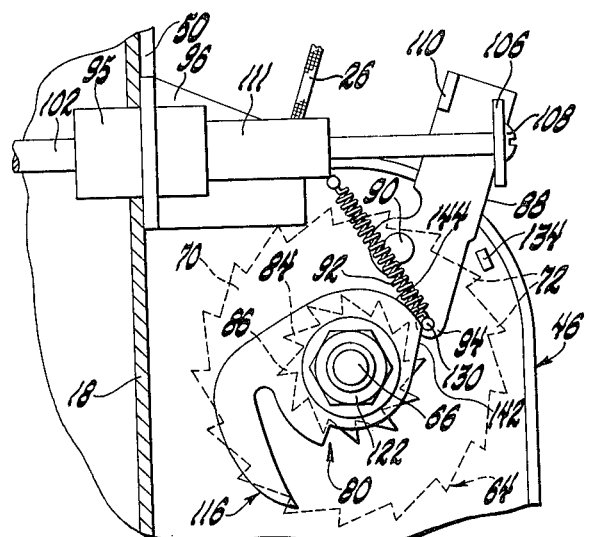
FIG. 5 is a view similar to FIG. 4 but showing the belt unwound further from the position of FIG. 4 with the pawl moved to an undetenting position.

The manner in which the control disc 116 controls the position of pawl 88 will now be described by first referring to FIG. 2 in which the belt 26 is fully wound on the reel 64. As the belt 26 is initially unwound from the fully stored condition on the reel 64, the control disc 116 is frictionally driven in the clockwise unwinding direction to the position of FIG. 4 in which the pawl 88 is released from the blocking surface 138 and is moved by spring 92 into engagement with one of the ratchet teeth 86 which is exposed by the detenting control surface 140. As belt unwinding continues, the ratchet plate 84 rotates and the pawl 88 ratchets progressively over the several ratchet teeth exposed by the detenting control surface 140. The control disc 116 continues to rotate with the reel so that the cam surface 142 engages the abutment pin 130 to move the pawl 88 to an undetenting position out of engagement with ratchet plate 84 as seen in FIG. 5. As unwinding continues, the pawl pin is traversed by the memory surface 144, and is then engaged by the disabling cam surface 146 which lifts the pawl 88 to its disabled position of FIG. 6 wherein the abutment pin 130 has gone overcenter with respect to pawl pivot shaft 90 so that spring 92 maintains the pawl in the disabled condition. The above motion of the winding prevention mechanism all occurs within the first few inches of unwinding of the belt 26 and is effective to disable the pawl from control by the control disc. Further unwinding of the reel continues as the control disc 116 remains stopped at its position of FIG. 6 by the engagement between pawl 88 and its stop 134.

Figure 7:
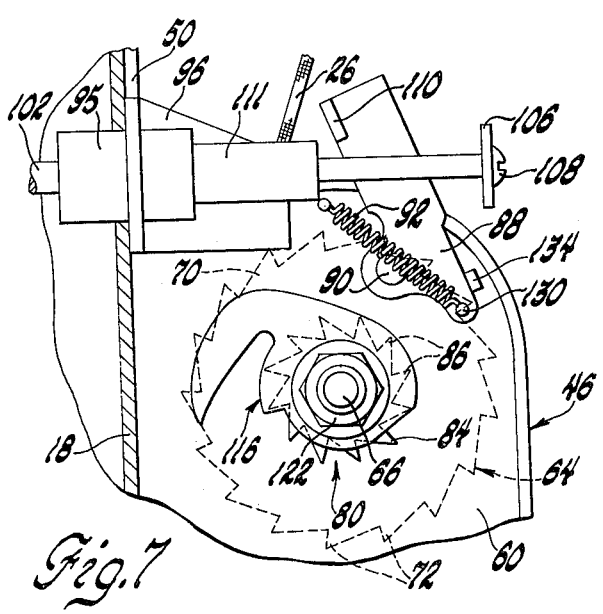
FIG. 7 is a view similar to FIG. 6 but showing the belt having been rewound somewhat in the reel.

Unwinding of the belt 26 is continued by the occupant until a sufficient length is withdrawn to permit engagement of the D-ring assembly in the buckle 49 so that the belt provides its restraining function about the lap and chest of the occupant. At this point there is generally several inches of slack in the belt and the winding spring rotates the belt reel 64 in the belt winding direction of rotation to retract the belt and take up the slack. During this winding of the belt the control disc 116 rotates in the counterclockwise direction as seen in FIG. 7 while spring 92 holds the pawl 88 in the disabled condition.

Subsequent to the buckling of the belt and the belt winding reel rotation to take up slack as described in the preceding paragraph, the belt 26 is held snuggly in taut relation against the chest of the occupant by the biasing action of the belt winding spring. The occupant may relieve the tension on the belt by leaning forward or pulling on the belt to unwind the belt somewhat. This unwinding of the belt causes rotation of the control disc 116 with the reel to the position of FIG. 4 wherein the blocking surface 138 is removed from support of the pawl abutment pin 130 allowing spring 92 to move pawl 88 into engagement of the first exposed ratchet tooth 86 of ratchet plate 84. This engagement prevents belt winding rotation of the reel 64 by the bias of the winding spring so that when the occupant leans back against the seat an amount of slack remains in the belt and the occupant is relieved of the tension that would be exerted across the chest by the belt 26. The occupant may further unwind the belt from the FIG. 4 position and the pawl tooth 94 will ratchet progressively over the ratchet plate teeth 86 exposed by the detenting control surface 140 to introduce additional increments of slack into the belt. The control disc 116 rotates with the belt reel during such further unwinding and eventually reaches its rotary position of FIG. 5 wherein cam surface 142 has lifted the pawl against the bias of spring 92 and out of engagement of the ratchet plate teeth 86 to the elevation of memory surface 144 so that the bias of winding spring is restored to tension the belt 26. Thus, when the occupant leans back against the seat or releases his pull on the belt, the belt reel 64 will be rotated in the belt winding direction under the bias of the winding spring. This winding rotation of the reel proceeds until cam surface 142 lowers the pawl tooth 94 into reengagement of the first exposed ratchet plate tooth 86 to again prevent belt winding reel rotation and thereby relieve the tension on the belt and hold the belt at the maximum permissible increment of slackened relation about the occupant.

As seen in FIG. 10, the memory surface 144 has a circumferential extent which defines a range of belt reel rotation during which the occupant may lean forward to reach vehicle controls or adjust the seating position and then upon leaning back against the seat, the belt will rewind until the control disc 116 returns to the rotary position wherein cam surface 142 lowers the pawl tooth 94 back into engagement with the ratchet plate tooth 86.

Figure 6:
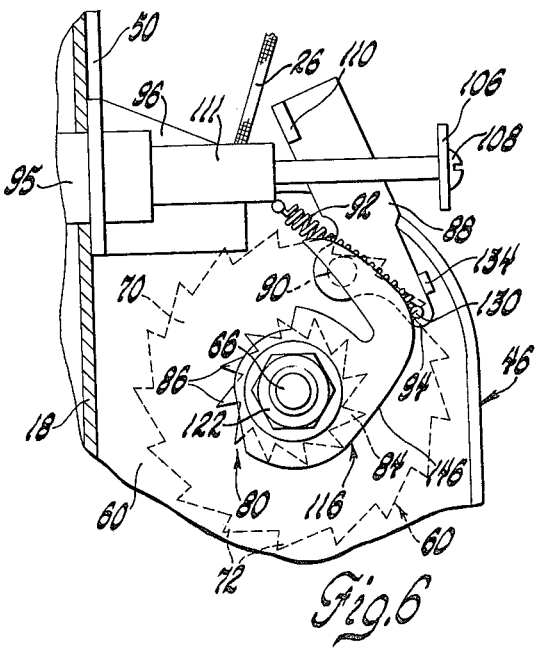
FIG. 6 is a view similar to FIG. 5 but showing the belt unwound further from the position of FIG. 5 and the pawl moved overcenter to its disabled position.

If, however, the clockwise belt unwinding is sufficient to rotate control disc 116 to the position of FIG. 6, the disabling cam surface 146 lifts the pawl 88 to the overcenter position of FIG. 6 in engagement with the stop 134. If belt unwinding continues, the stop 134 and pawl 88 cooperate to stop the control disc 116 at its rotary position of FIG. 6 as the friction clutch provided by the spring washer 126 permits continued rotation of the belt reel.

The pawl 88 remains in its disabled position as seen in FIG. 7 irrespective of subsequent winding and unwinding of the belt and until the belt is rewound sufficiently to carry the control disc 116 to its position of FIG. 8 wherein the enabling cam surface 152 engages the pawl 88 to move the pawl from its overcenter position so that the spring 92 will lower the pawl into engagement of the blocking surface 138, thus, restoring the pawl to control by the control disc 116.

Figure 9:
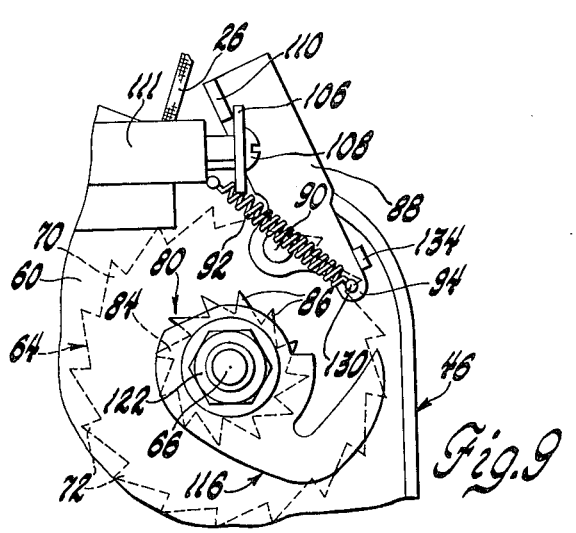
FIG. 9 is a view similar to FIG. 4 but showing the pawl moved to the disabled position upon opening of the vehicle door.

Referring again to FIG. 4, it is seen that the lateral leg 110 of pawl 88 is in close proximity to the washer 106 carried by plunger 102 when the vehicle door is closed and when the pawl tooth 94 is in detenting engagement of the ratchet plate teeth 86 to establish a slackened relation of the belt. Accordingly, as seen in FIG. 9 if the vehicle occupant unbuckles the belt, and then opens the vehicle door, the plunger 102 is released for leftward movement by the spring 112 so that the washer 106 engages lateral leg 110 and carries the pawl 88 out of detenting engagement with the ratchet plate, thus releasing the winding prevention mechanism to allow complete winding and storage of the belt on the reel.

Summary of the Operation

In summary, the operation of the belt proceeds from a fully wound condition as the vehicle occupant extends the belt for use. The control disc 116 rotates with the reel in the unwinding direction until reaching the position of FIG. 6 wherein pawl 88 is stopped at its overcenter position by stop 134 and in turn stops further rotation of the control disc 116. When the belt is buckled about the occupant, the winding spring rotates the reel to eliminate slack in the belt and pull the belt taut against the occupant. The control disc 116 rotates with the reel during the belt winding rotation upon reaching its position of FIG. 8 and returns the pawl from its overcenter position to its position of FIG. 2.

A slight unwinding of the belt from the FIG. 2 position by leaning foward or pulling on the belt actuates the winding prevention mechanism by rotating the control disc to the position of FIG. 4 wherein the pawl spring 92 moves pawl 88 into engagement of the ratchet teeth 86. Belt unwinding within the predetermined range defined by the circumferential extent of detenting control surface 140 results in a one-way ratcheting action which introduces progressive additional increments of slack into the belt. Belt unwinding beyond this first range causes the cam surface 142 to lift the pawl onto memory surface 144 which defines a second predetermined range which will allow the belt to be rewound by the winding spring until the pawl is again lowered by the cam surface 142 into reengagement of the first exposed ratchet plate tooth. If belt unwinding proceeds beyond the second range, the disabling cam surface 146 lifts the pawl to the overcenter position of FIG. 6 wherein the winding prevention mechanism is cancelled to provide continuous tension on the belt causing it to be pulled taut across the occupant and/or to be fully wound to the stored position by the bias of the winding spring when unbuckled.

Thus, the present invention provides an improved and simplified winding prevention mechanism wherein the pawl is biased into engagement of the ratchet reel by a spring which goes overcenter upon movement of the pawl away from engagement with the ratchet reel so that the spring is effective to hold the pawl in a disabled position. A single control disc is clutched for rotation with the reel and has a control surface configured to selectively move the pawl into and out of detenting positions and further control movement of the pawl into and out of the disabled position.

The embodiments of the invention in which an exclusive property or privilege is claimed are defined as follows:

1. In combination, an automotive vehicle having an occupant seat, a restraint belt for restraining an occupant in the seat, a reel having the belt wound thereon, a winding spring urging belt winding reel rotation to retract the belt on the reel and pull the belt taut against the occupant, a locking mechanism effective to prevent belt extension only in response to a sensed acceleration condition so that the occupant may normally lean forwardly in the seat by extending the belt from the reel, a ratchet wheel conneted with the reel for rotation therewith, a pawl selectively engageable with the ratchet wheel to prevent belt winding reel rotation by the winding spring, spring means acting on the pawl and urging the pawl toward engagement with the ratchet wheel, a control member mounted for rotation with the reel and having a cam surface for controlling movement of the pawl into and out of engagement with the ratchet wheel in response to a predetermined sequence of rotation of the control member, said spring means going overcenter upon predetermined movement of the pawl away from engagement with the ratchet wheel so that the spring holds the pawl in a disabled condition irrespective of rotation of the control member to a position which would otherwise engage the pawl with the ratchet wheel, and said control member having cam means thereof adapted to operate the pawl to and from the disabled position.

2. In combination, an automotive vehicle having an occupant seat, a restraint belt for restraining an occupant in the seat, a reel having the belt wound thereon, a winding spring urging belt winding reel rotation to retract the belt on the reel and pull the belt taut against the occupant, a locking mechanism effective to prevent belt unwinding only in response to a sensed acceleration condition so that the occupant may normally lean forwardly in the seat by unwinding the belt from the reel, a ratchet wheel connected with the reel for rotation therewith, a pawl selectively engageable with the ratchet wheel to prevent belt winding reel rotation by the winding spring, spring means acting on the pawl and urging the pawl toward engagement with the ratchet wheel, a control member mounted for rotation with the reel and having a cam surface for controlling movement of the pawl into and out of engagement with the ratchet wheel in response to a predetermined sequence of rotation of the control member, said spring means going overcenter upon predetermined movement of the pawl away from engagement with the ratchet wheel so that the spring holds the pawl in a disabled condition irrespective of rotation of the control member to a position which would otherwise engage the pawl with the ratchet wheel, cam members on the control member adapted to operate the pawl to and from the disabled condition in response to predetermined reel rotation, a vehicle door hinged for movement between open and closed positions, and means responsive to movement of the door to the open position to operate the pawl to the disabled condition irrespective of the rotational position of the control member.

3. In combination, an automotive vehicle having an occupant seat, a restraint belt for restraining an occupant in the seat, a reel for storing the belt and having a winding spring urging belt winding reel rotation to retract the belt on the reel and tension the belt about the occupant, a locking mechanism effective to prevent belt extension only in response to a sensed acceleration condition so that the occupant may normally extend the belt for engagement in restraining position about the occupant and further extend the belt to permit forward leaning movement in the seat by unwinding the belt from the reel, a ratchet plate connected to the reel for rotation therewith, a pawl movable between a detenting position engaging the ratchet plate to prevent belt winding reel rotation by the winding spring and a range of undetenting positions allowing belt reel rotation by the winding spring, spring means acting on the pawl and normally urging the pawl toward the detenting position, said spring means going overcenter upon movement of the pawl to a furthest undetenting position so that the pawl is held in the furthest undetenting position, a control disc rotatably mounted on the reel and having a control surface engageable by the pawl for controlling movement of the pawl, means coacting between the disc and the pawl to limit rotation of the disc to less than one revolution between a limit in the unwinding direction and another limit in the winding direction, friction clutch means acting between the disc and the reel to rotate the disc with the reel in both directions and allow the disc to stop at the winding and unwinding limits during continued rotation of the reel to wind and unwind the belt, the configuration of the control surface of the disc being such that the pawl is held in undetenting position when the disc is stopped at the winding limit and upon subsequent belt unwinding rotation from the winding limit the pawl is released for movement to the detenting position by the spring to relieve belt tension by preventing winding reel rotation, said disc having a lifting cam surface for moving the pawl to the furthest undetenting position upon belt unwinding to the unwinding limit of rotation of the disc so that the spring goes overcenter and holds the pawl in the furthest undetenting position during subsequent winding reel rotation by the winding spring, and another cam surface on the control disc for returning the pawl from the furthest undetenting position when the disc reaches the winding limit of rotation.

4. In combination, an automotive vehicle having an occupant seat, a restraint belt for restraining an occupant in the seat, a reel for storing the belt and having a winding spring urging belt winding reel rotation to retract the belt on the reel and tension the belt against the occupant, a locking mechanism effective to prevent belt extension only in response to a sensed acceleration condition so that the occupant may normally extend the belt for engagement in restraining position about the occupant and further extend the belt to permit forward leaning movement in the seat by unwinding the belt from the reel, a ratchet plate connected to the reel for rotation therewith, a pawl movable between a detenting position engaging the ratchet plate to prevent belt winding reel rotation by the winding spring and first and second undetenting positions allowing belt winding reel rotation by the winding spring, spring means acting on the pawl and urging the pawl from the first undetenting position to the detenting position, said spring means going overcenter upon movement of the pawl between first undetenting and second undetenting positions so that the pawl is held in the second undetenting position, a control disc rotatably mounted on the reel and having a surface for controlling movement of the pawl, means for limiting rotation of the disc to less than one revolution between one limit in the unwinding direction and another limit in the winding direction, friction clutch means acting between the disc and the reel to rotate the disc with the reel in both directions and allow the disc to stop at the limits, the configuration of the surface of the disc being such that upon belt unwinding rotation from the winding limit of rotation of the disc the pawl is in detenting position over a first range of angular positions of the disc to relieve belt tension by preventing winding reel rotation, upon further belt unwinding rotation the pawl is moved to the first undetenting position over a second range of angular positions of the disc so as to permit subsequent limited winding rotation of the reel and rotation of the disc to within the first range of angular positions and return the pawl to the detenting position to thereby relieve the belt tension, and upon belt unwinding beyond the second range of angular positions and rotation of the disc to the unwinding limit the pawl is moved to the second undetenting position so that the spring goes overcenter and the pawl is held in the second undetenting position during subsequent belt winding reel rotation whereby the winding spring urges belt winding reel rotation and the belt tension is restored.

* * * * *

UNITED STATES PATENT AND TRADEMARK OFFICE
CERTIFICATE OF CORRECTION

PATENT NO. : 4,065,155
DATED : December 27, 1977
INVENTOR(S) : Lloyd W. Rogers, Jr.

It is certified that error appears in the above–identified patent and that said Letters Patent are hereby corrected as shown below:

Column 1, line 48, "reaction" should read -- ratchet --.

Column 8, line 38, "members" should read -- means --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks